Sept. 8, 1970             J. BUHR             3,528,015
AUTOMATIC MOTOR TURN-ON NETWORKS FOR SIGNAL SEEKING RECEIVERS
Filed May 8, 1967
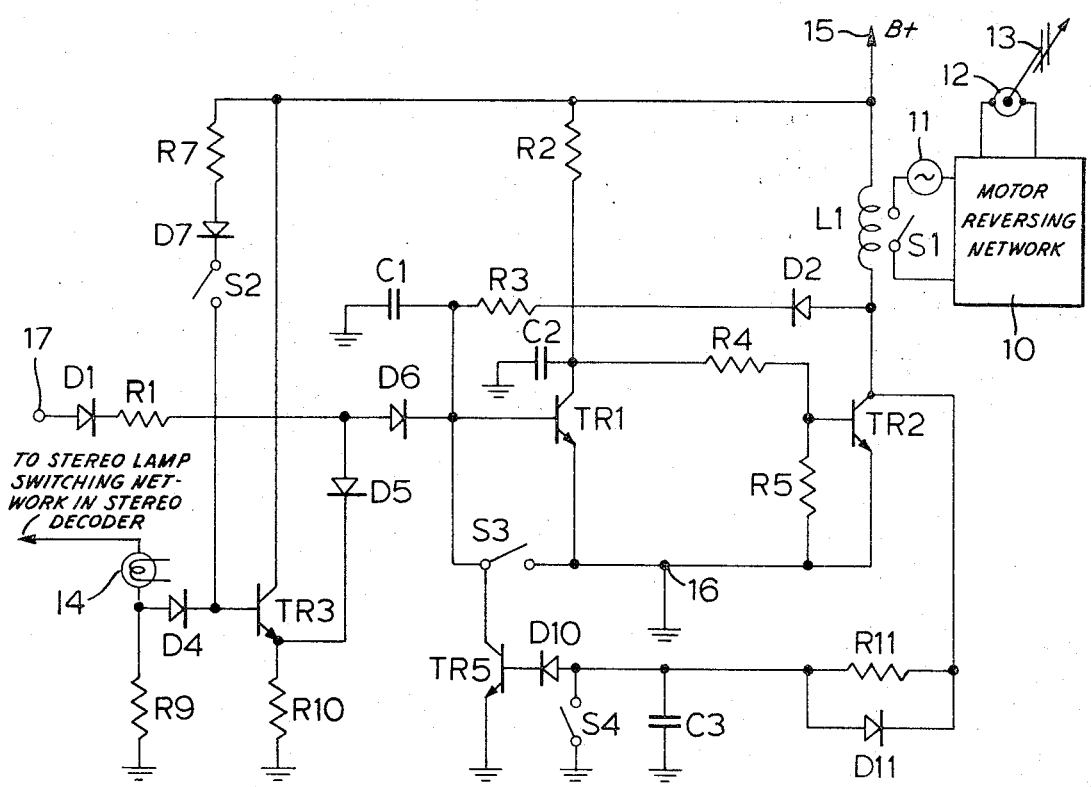

United States Patent Office 3,528,015
Patented Sept. 8, 1970

3,528,015
AUTOMATIC MOTOR TURN-ON NETWORKS FOR SIGNAL SEEKING RECEIVERS
Jacob Buhr, Kitchener, Ontario, Canada, assignor to Electrohome Limited, Kitchener, Ontario, Canada
Filed May 8, 1967, Ser. No. 636,716
Int. Cl. H04b 1/32
U.S. Cl. 325—471                10 Claims

ABSTRACT OF THE DISCLOSURE

A signal seeking receiver having an automatic shut-off network for automatically turning off the motor of the receiver responsive to the tuning in of a signal is provided with a network that automatically turns on the motor after the receiver has been tuned to a station for a predetermined period of time.

---

This invention relates to radio receivers of the signal seeking type. More particularly, this invention relates to networks for automatically turning off the motor of a signal seeking receiver for a short predetermined period of time when the receiver is tuned to the frequency of a signal being received by the receiver and of a strength greater than a minimum predetermined signal strength, and for automatically turning on the motor after the period of time has elapsed, unless the network is inhibited during the period.

In any signal seeking receiver it is necessary to provide some means for turning on the motor that drives the tuning condenser of the receiver when the latter is turned on but no signal is being received, or when it is desired to change stations. These means must be capable of automatically shutting off the motor when the receiver is tuned to a signal of a level greater than a minimum predetermined level. It also would be desirable to provide means for turning on the motor automatically after it has been locked on a station for a short period of time sufficient to enable a listener to decide whether or not he wishes the receiver to remain tuned to that station. Such means should be capable of being inhibited, of course, so as to enable the receiver to remain tuned to a given station as long as desired by the listener. In accordance with this invention, a network is provided for accomplishing these objectives.

A signal seeking receiver embodying this invention is of a type having variable tuning means for varying the tuning of the receiver, a motor drivingly connerted to the tuning means, whereby the tuning of the receiver can be changed by operation of the motor, and an automatic shut-off network for automatically turning off the motor when the receiver is tuned to the frequency of a signal being received by the receiver and of a strength greater than a minimum predetermined signal strength. In accordance with this invention, such a receiver is provided with means for automatically turning on the motor after the receiver has been tuned to a received signal for a predetermined period of time.

This invention will become more apparent from the following detailed description, taken in conjunction with the appended drawing.

The single figure is a circuit diagram of an automatic shut-off and turn-on network embodying this invention.

Referring to the figure, there is shown a motor 12 whose drive shaft is connected to the tuning capacitor 13 of a signal seeking receiver. Power to operate motor 12 is provided from any suitable A.C. or D.C. source, an A.C. source being schematically indicated in the figure as an A.C. generator 11, via the contacts S1 (when closed) of a relay and a motor reversing network 10, which may be of a conventional type. In fact, motor reversing network 10 is not essential to the operation of this invention, since, when tuning capacitor 13 reaches the limit of its travel in one direction, it could be returned manually to the other limit of its travel. The coil of the relay having contacts S1 is designated L1 in the figure.

The automatic shut-off network shown in the figure employs two transistors: TR1 and TR2. A third transistor TR3 is employed for stereo only signal seeking. A terminal 15 is connected to the positive terminal of a suitable D.C. source (B+), such as a battery or other D.C. power supply. Terminal 15 is connected via coil L1 to the collector electrode of transistor TR2. The emitter electrode of this transistor is connected to a terminal 16 at a D.C. reference potential, in the present case, ground potential. Terminal 15 also is connected via coil L1, a diode D2 and a resistor R3 to the base electrode of transistor TR1, whereby bias may be applied to the base electrode of transistor TR1. A capacitor C1 is connected between the base electrode of transistor TR1 and ground to prevent transistors TR1 and TR2 from oscillating via the loop consisting of diode D2 and resistor R3. The collector electrode of transistor TR1 is connected via a resistor R4 to the base electrode of transistor TR2. A resistor R5 is connected in voltage divider relationship with resistor R4 between terminal 16 and the base electrode of transistor TR2. A capacitor C2 is connected between ground and the collector electrode of transistor TR1 for the purpose of ensuring that upon the application of B+ to terminal 15, transistor TR1, rather than transistor TR2, will turn on. Terminal 15 also is connected to the collector electrode of transistor TR1 via a resistor R2. A switch S3 is connected between the base electrode of transistor TR1 and ground. A signal input terminal 17 is connected to the base electrode of transistor TR1 via an isolating diode D1, a resistor R1 and a diode D6. The signal applied to signal input terminal 17 may be derived, for example, from any one of the I.F. amplifiers of the receiver, further amplified, if necessary, and then detected to provide a positive D.C. signal, the latter being applied to terminal 17. The emitter electrode of transistor TR1 is connected to terminal 16.

A circuit consisting of a resistor R7, a diode D7 and switch S2 is connected between terminal 15 and the base electrode of transistor TR3. A diode D5 having its anode connected to the anode of diode D6 is connected between the emitter electrode of transistor TR3 and the common terminal of resistor R1 and diode D6. A resistor R10 is connected between the emitter electrode of transistor TR3 and ground. The stereophonic indicator lamp 14 of the receiver is connected via a resistor R9 to ground and also via a diode D4 to the base electrode of transistor TR3. Stereophonic indicator lamp 14 and resistor R9 are so connected to the base electrode of transistor TR3 that when the receiver is tuned to an F.M. stereophonic signal, as opposed to an F.M. monaural signal, there will be a sufficient voltage drop across resistor R9 to turn on transistor TR3, assuming that the received signal is of sufficient strength, of course. Other arrangements to ensure the turn on of transistor TR3 with switch S2 open only when the receiver is tuned to a stereophonic signal having a strength greater than a minimum predetermined strength could be used, of course.

It should be noted that the part of the network of the figure described above is described and claimed in copending application Ser. No. 602,944 filed Dec. 19, 1966, entitled Selective Automatic Motor Shut-Off Networks for Signal Seeking Receivers, Jacob Buhr.

The operation of the network just described now will be discussed assuming no automatic turn-on network embodying this invention to be connected between the collector electrode of transistor TR2 and the base electrode of transistor TR1. When relay contacts S1 are closed, generator 11 will be connected to motor 12 via closed contacts S1 and motor reversing network 10, and motor 12 will drive tuning capacitor 13 to change the tuning of the receiver. Motor reversing network 10 can include microswitches that are operated when the tuning capacitor reaches the limits of its travel in both directions, operation of the microswitches causing motor 12 to reverse direction.

Transistors TR1 and TR2 are so connected that when one is turned on, the other is kept turned off, and vice versa until the state of conduction of the former transistor changes.

The collector and emitter electrodes of transistor TR2 are connected in a circuit through which current required in order for motor 12 to operate must flow. In this respect, motor 12 only can operate provided that transistor TR2 is turned on. Only under these conditions can sufficient current pass from terminal 15 through coil L1 and the collector and emitter electrodes of transistor TR2 to ground to close relay contacts S1. Of course, rather than employing a relay, transistor TR2 could be connected in a circuit through which either the armature or the field current of motor 12 must pass. Such an arrangement is shown, for example, in copending application Ser. No. 602,944 filed Dec. 19, 1966, for Automatic Shut-Off Networks for Signal Seeking Receivers, Jacob Buhr.

With switch S3 open, switch S2 open or closed and a positive D.C. potential, B+, which may be 10 to 12 volts for example, applied to terminal 15, transistor TR1 will be biased on, even if there is no input signal present at signal input terminal 17. With transistor TR1 turned on, transistor TR2 will be kept off, and, since transistor TR2 must be turned on before motor 12 can start, motor 12 will not operate.

The path for the current required to turn on transistor TR1 includes coil L1, diode D2, resistor R3 and the base-emitter junction of transistor TR1. Diode D2 provides a low impedance path for the turn on current which assists in ensuring that transistor TR1 will be turned on before transistor TR2 when B+ is applied to terminal 15. It will be appreciated that if transistor TR1 were not turned on before transistor TR2, the latter transistor would be turned on due to current flowing from terminal 15 to terminal 16 via resistors R2, R4 and R5. This would result in transistor TR1 losing its control function.

Diode D2 presents a high impedance to any positive signal appearing at the base electrode of transistor TR1, by virtue of which excessive loading of this signal is eliminated.

With switch S2 closed, the network will operate in such a manner that motor 12 will stop when the receiver is tuned to the frequency of a signal being received by the receiver and of a strength greater than a minimum predetermined signal strength regardless of whether the signal is a monaural or a stereophonic signal. With switch S2 closed, switch S3 open, and B+ applied to terminal 15, transistor TR1 will be turned on and will keep transistor TR2 turned off. Under these circumstances, the small current which will flow through coil L1 will be unable to close contacts S1, so motor 12 will not be operating. In order to start motor 12, it is necessary to close momentarily switch S3, which will ground the base electrode of transistor TR1. When this is done, the relatively high voltage which, prior to the momentary closing of switch S3, had been applied to the base electrode of transistor TR1 via coil L1, diode D2 and resistor R3 and which kept this transistor turned on, immediately will decrease to ground potential causing transistor TR1 to turn off. When transistor TR1 turns off, the voltage at its collector electrode will rise, and this relatively high voltage will be applied to the base electrode of transistor TR2 via the voltage divider network consisting of resistors R4 and R5, and, whereas when transistor TR1 was turned on and its collector voltage was relatively low, thereby holding transistor TR2 off, now transistor TR2 will turn on because of the increase in the voltage which will be applied to its base electrode when transistor TR1 is turned off. The voltage at the collector electrode of transistor TR2 will drop as soon as this transistor turns on, and this relatively low voltage will be applied to the base electrode of transistor TR1 via diode D2 and resistor R3, thereby keeping transistor TR1 turned off. The voltage at the collector electrode of transistor TR2 when it is turned on is dependent on the saturation voltage of the transistor and typically may be of the order of +0.2 to +0.3 volt. Once transistor TR2 is turned on, a current sufficient to close contacts S1 will flow from terminal 15 to terminal 16 via coil L1 and the collector and emitter electrodes of transistor TR2 and motor 12 will begin to operate.

It will be understood that when switch S2 is closed with switch S3 open, transistor TR3 also will be turned on when B+ is applied to terminal 15. When transistor TR3 is turned on, a voltage will be developed across resistor R10 that will back bias diode D5, thereby preventing any shunting effect on the base electrode of transistor TR1. With switch S2 closed, transistor TR3 will remain turned on regardless of the state of conduction of transistors TR1 and TR2.

Motor 12 will continue to run until the receiver becomes tuned to either a monaural or a stereophonic signal of a strength greater than a minimum predetermined strength. When the receiver is tuned to such a signal, an input signal will be applied to input terminal 17. This signal will appear as a positive D.C. voltage at the base electrode of transistor TR1. Provided that the signal at the base electrode of transistor TR1 is above a minimum level, transistor TR1 will turn on. Transistor TR2 then will be turned off, by virtue of which the current flowing through coil L1 will be decreased to a value insufficient to hold contacts S1 closed, as a result of which motor 12 will stop.

In order to tune another station, it is only necessary to momentarily close switch S3 again, whereupon the sequence of events outlined hereinbefore will be repeated.

If it is desired to listen only to stations broadcasting stereophonic signals, switch S2 should be opened. In the absence of the receiver being tuned to a stereophonic signal, transistor TR3 will not normally conduct, and any signal indicative of reception of a monaural signal and applied to the base electrode of transistor TR1 via diode D1 and resistor R1 will be shunted to ground via diode D5 and resistor R10, so that transistor TR1 will not turn on if resistors R1 and R10 are properly chosen. The voltage at the junction of diodes D5 and D6 will have to be of the order of +0.8 volt in order to turn on transistor TR1. Since the forward voltage drop of diode D5 will be of the order of +0.6 volt, the drop across resistor R10 must exceed about +0.2 volt before transistor TR1 will turn on. By choosing resistors R1 and R10 relative to the maximum voltage which will appear at input terminal 17, transistor TR1 can be prevented from turning on for any monaural signal.

When the receiver is tuned to a stereophonic signal, a voltage will be developed across resistor R9. This voltage will be applied via diode D4 to the base electrode of transistor TR3. The voltage applied to the base electrode of transistor TR3 via diode D4 will turn on transistor TR3, assuming the signal to be of sufficient strength, and a voltage then will be developed across resistor R10 which will be approximately 0.6 volt (forward base-emitter drop of transistor TR3) below the base voltage of transistor TR3. The voltage developed across resistor R10 under these circumstances will back bias diode D5, so that transistor TR1 then can be turned on by the signal applied to input terminal 17. When transistor TR1 is turned on, transistor TR2 will be turned off and motor 12 will stop. The relatively high voltage appearing at the collector electrode of transistor TR2 when it is turned off will keep transistor TR1 turned on via diode D2 and resistor R3.

In order to select another station broadcasting a stereophonic program, it is only necessary to momentarily close switch S3 again. This will cause transistor TR1 to turn off, which, in turn, will cause transistor TR2 to turn on and motor 12 to operate. Transistor TR3 will turn off when the tuner is pulled off station by operation of motor 12, and it will not normally turn on again until the receiver is tuned to another stereophonic signal.

It should be appreciated that by adding other diodes at the junction of diode D1 and resistor R1, other control voltages may be used, e.g., control voltages indicative of tuning to an A.M. station. Since these additional diodes will be reverse bias connected with respect to diode D1 and each other, no appreciable loading will take place.

It should be noted that diode D4 serves to prevent current flowing through resistor R7 and diode D7 from passing through indicator lamp 14 when switch S2 is closed. It also will prevent noise pulses having a magnitude less than the diode voltage of diode D4 from turning on transistor TR3 when switch S2 is open.

Capacitor C2 ensures that the voltage applied to the base electrode of transistor TR2 when B+ is applied initially to terminal 15 will be kept relatively low. This aids in ensuring that transistor TR1 will be turned on before transistor TR2 when B+ is applied initially to terminal 15.

As aforementioned, the function of capacitor C1 is to prevent oscillation of the trigger circuit consisting of transisors TR1 and TR2 and the components which interconnect the same.

In accordance with this invention, there is connected between the collector electrode of transistor TR2 and the base electrode of transistor TR1 what could be referred to as an automatic turn-on network. This network includes a transistor TR5, diodes D10 and D11, a switch S4, a capacitor C3 and a resistor R11. The collector electrode of transistor TR5 is connected to the base electrode of transistor TR1, the emitter electrode of transistor TR5 being connected to ground. One terminal of resistor R11 is connected to the collector electrode of transistor TR2, the other terminal of resistor R11 being connected to the anode of diode D10. The cathode of diode D10 is connected to the base electrode of trasistor TR5. Diode D11 is connected across resistor R11 with the cathode of the diode being connected to the collector electrode of transistor TR2, so that diode D11 is reverse biased when transistor TR2 is off. Capacitor C3 is connected between ground and the common terminal of resistor R11 and diode D10, while switch S4 is connected across capacitor C3.

The operation of the automatic turn-on network now will be discussed assuming switch S4 to be open. As aforementioned, when the receiver is tuned to a station, transistor TR2 will be turned off and its collector voltage will be relatively high. Under these circumstances, capacitor C3 will charge towards B+ via resistor R11. When capacitor C3 has charged to a value exceeding the forward voltage drop of diode D10 plus the forward base-emitter voltage drop of transistor TR5, transistor TR5 will turn on and will lower the voltage at the base electrode of transistor TR1 sufficiently to cause transistor TR1 to turn off. Turn off of transistor TR1, as hereinbefore explained, will cause transistor TR2 to turn on and motor 12 to operate. As soon as transistor TR2 turns on, capacitor C3 will discharge via diode D11 and transistor TR2 to a voltage corresponding to the forward voltage drop of diode D11 plus the saturation voltage drop of transistor TR2. As soon as the receiver is tuned to another signal of suitable strength, transistor TR2 will be turned off in the manner hereinbefore outlined, and capacitor C3 will commence charging from a low voltage determined by the forward voltage drop (0.6 volt) of diode D11 plus the saturation voltage drop (0.2–0.3 volt) of transistor TR2 to a relatively higher voltage equal to the forward voltage drop (0.6 volt) of diode D10 plus the forward base-emitter voltage drop (0.6 volt) of transistor TR5.

The time taken for capacitor C3 to charge to a voltage sufficient to turn on transistor TR5 can be increased by increasing the time constant of capacitor C3 and resistor R11 or by placing additional diodes in series with diode D10.

It will be seen from the foregoing that with switch S4 open, the receiver will lock-in on a station and will remain tuned to that station for a predetermined length of time, after which motor 12 will be started automatically and another station selected. During the interval when the receiver is tuned to the station, a listener can decide whether or not he wishes to continue to listen to that particular station. If he does, the listener need only close switch S4. This will short circuit capacitor C3, preventing the capacitor from charging and inhibiting the automatic turn-on network. Since the effect of closing switch S4 is to ground one terminal of resistor R11, resistor R11 should be sufficiently large that sufficient current cannot flow from B+ through coil L1 and resistor R11 to cause motor 12 to operate when transistor TR2 is off.

It should be noted that this invention also may be used for the purpose of life testing motor 12 providing, as it does, a means for cycling motor 12 on and off.

It should be appreciated that transistor TR3 and its associated components are not essential to the practice of this invention. This transistor and its associated components are employed for the purpose of providing an automatic shut-off network which is selective with respect to stereophonic signals. The instant invention is applicable regardless of the type of signal being received by the receiver and regardless of whether the receiver will lock in only in respect of one type of signal or in respect of all types of signals.

While it is important that a path be provided that permits capacitor C3 to discharge to a voltage lower than that required to cause transistor TR5 to turn on, and that this path be established in response to the turn on of transistor TR2, it is not necessary for transistor TR2 to constitute a part of this path. Thus, for example, the discharge path could include another transistor not shown in the figure but connected to turn on and off simultaneously with the turn on and off of transistor TR2.

While preferred embodiments of this invention have been disclosed herein, those skilled in the art will appreciate that changes and modifications may be made therein without departing from the spirit and scope of this invention as defined in the appended claims.

What I claim as my invention is:

1. In a signal seeking receiver of a type having variable tuning means for varying the tuning of said receiver, a motor drivingly connected to said tuning means, whereby the tuning of said receiver can be changed by operation of said motor, and an automatic shut-off network for automatically turning off said motor when said receiver is tuned to the frequency of a signal generated externally of and being received by said receiver, said signal containing information to be reproduced by said receiver and being of a strength greater than a minimum predetermined signal strength; means responsive to said receiver being tuned to said received signal for a predetermined period of time for automatically turning on said motor.

2. The invention according to claim 1 wherein said automatic shut-off network comprises first and second transistors each having base, collector and emitter electrodes, said transistors being interconnected such that when either of said transistors is turned on or off, the other of said transistors is kept turned off or on respectively until the state of conduction of the first mentioned transistor changes; said signal seeking receiver also including means for supplying a first signal to said base electrode of said first transistor when said receiver is tuned to the frequency of a signal being received by said receiver to turn on said first transistor when said first signal is of a strength greater than a minimum predetermined signal strength; means connecting said collector and emitter electrodes of said second transistor in a circuit through which current required in order for said motor to operate must pass, whereby when said second transistor is turned off, said current is unable to flow through said circuit and said motor ceases operating; means for supplying a biasing voltage to said first transistor to turn on said first transistor when said motor is not operating; switching means having first and second different states and which initiate operation of said motor when in said second state; and means responsive to said switching means being in said second state providing a path for reducing said biasing voltage supplied to said first transistor below that required to keep said first transistor turned on, whereby said first transistor is turned off when said switching means is in said second state; said means for automatically turning on said motor comprising means for automatically turning off said first transistor after said receiver has been tuned to one of said received signals for a predetermined period of time.

3. The invention according to claim 2 wherein the last-mentioned means include a third transistor, and means for turning said third transistor on after said predetermined period, said first and third transistors being interconnected such that when said third transistor is turned on, said first transistor will be turned off.

4. The invention according to claim 2 wherein the last-mentioned means comprise a third transistor having base, collector and emitter electrodes, a first diode, a first resistor and a first capacitor, said first and third transistors being interconnected such that when said third transistor is turned on, said first transistor will be turned off, said first capacitor being connected to be charged via said first resistor, said first diode being connected between said first capacitor and said base electrode of said third transistor and providing a path for turn on of said third transistor after said first capacitor has charged to a first voltage greater than the forward voltage drop of said first diode plus the forward base-emitter voltage drop of said third transistor, and a network providing a path for discharge of said first capacitor to a second voltage less than said first voltage in response to said second transistor being turned on.

5. The invention according to claim 2 wherein the last-mentioned means comprise a third transistor having base, collector and emitter electrodes, first and second diodes, a first resistor, and a first capacitor, said first and third transistors being interconnected such that when said third transistor is turned on, said first transistor will be turned off, said collector electrode of said third transistor being connected to said base electrode of said first transistor, said first capacitor being connected to be charged via said first resistor, said first diode being connected between said first capacitor and said base electrode of said third transistor and providing a path for turn on of said third transistor after said first capacitor has charged to a first voltage greater than the forward voltage drop of said first diode plus the forward base-emitter voltage drop of said third transistor, and circuit means providing a path for discharge of said first capacitor to a second voltage lower than said first voltage when said second transistor is turned on, said circuit means including said second diode and said collector and emitter electrodes of said second transistor, said second diode being connected between said first capacitor and said collector electrode of said second transistor and being reverse biased when said second transistor is turned off.

6. The invention according to claim 5 including a second resistor connected between said collector electrode of said first transistor and said base electrode of said second transistor, a third resistor connected in voltage divider relationship with said second resistor and connected between said base electrode of said second transistor and a terminal at a reference potential, means connecting said emitter electrodes of said first and second transistors and said terminal, and a third diode and a fourth resistor connected in series circuit with each other between said collector electrode of said second transistor and said base electrode of said first transistor.

7. The invention according to claim 6 wherein said means for supplying a biasing voltage to said first transistor comprises a D.C. power supply, said third diode and said fourth resistor, said D.C. power supply also being connected to said collector electrode of said second transistor and to said collector electrode of said first transistor and being the source of charging current for said first capacitor, said first resistor being connected between said collector electrode of said second transistor and said first capacitor.

8. The invention according to claim 1 wherein the last-mentioned means include a capacitor, means for charging said capacitor during said predetermined period, and means providing a path for discharge of said capacitor when said motor is operating to a voltage less than the voltage to which said capacitor charges during said predetermined period.

9. The invention according to claim 1 including means for inhibiting operation of said means for automatically turning on said motor.

10. The invention according to claim 8 including means for inhibiting operation of said means for automatically turning on said motor.

References Cited

UNITED STATES PATENTS

| | | | |
|---|---|---|---|
| 2,525,442 | 10/1950 | Bischoff | 325—469 XR |
| 2,799,776 | 7/1957 | Taylor et al. | 325—471 |
| 2,639,373 | 5/1953 | Goodrich | 325—469 |
| 2,904,676 | 9/1959 | Andrews | 325—471 XR |
| 3,241,072 | 3/1966 | Brand | 325—471 XR |

ROBERT L. GRIFFIN, Primary Examiner

R. S. BELL, Assistant Examiner

U.S. Cl. X.R.

179—15; 325—470; 334—20